United States Patent [19]

Zuccaro et al.

[11] Patent Number: 5,002,500
[45] Date of Patent: Mar. 26, 1991

[54] QUICK CONNECT/DISCONNECTOR FOR HIGH AMPERAGE CURRENT

[75] Inventors: Dante C. Zuccaro, Allenton; Frederick A. McCurdy, Royal Oak, both of Mich.

[73] Assignee: General Motors Corporation, Detroit, Mich.

[21] Appl. No.: 487,519

[22] Filed: Mar. 2, 1990

[51] Int. Cl.$^5$ .............................................. H01R 4/50
[52] U.S. Cl. .................................... 439/348; 439/378; 439/197
[58] Field of Search .................... 439/347, 348, 13, 18, 439/23, 27, 28, 158, 161, 152, 180, 378, 197; 29/568; 279/4, 75

[56] References Cited

U.S. PATENT DOCUMENTS

| | | |
|---|---|---|
| 4,091,255 | 5/1978 | Yamamoto ............................. 439/27 |
| 4,304,452 | 12/1981 | Kiefer .................................. 439/199 |
| 4,420,199 | 12/1983 | Vis et al. .............................. 439/13 |
| 4,793,053 | 12/1988 | Zuccaro et al. ....................... 429/568 |

Primary Examiner—David L. Pirlot
Attorney, Agent, or Firm—Ernest E. Helms

[57] ABSTRACT

An electrical connector for a manual welding machine includes first and second contacts each having a frustoconical surface thereon engageable with one another for carrying high amperage current between the first and second contacts; one of the contacts connects to a kickless cable and the other of the contacts connects to a welding head; the contacts include a self-contained lockup mechanism concentrically within the first and second contacts for pulling the contacts together as they are initially mated to impose an amplified axial force therebetween which is amplified further in a direction transverse to the axial force to produce a contact pressure between the frustoconical surfaces of the first and second contacts of a magnitude to assure low resistance flow of high amperage welding current.

5 Claims, 3 Drawing Sheets

QUICK CONNECT/DISCONNECTOR FOR HIGH AMPERAGE CURRENT

FIELD OF THE INVENTION

This invention relates to electrical connectors for carrying high amperage current, and more particularly, to electrical connectors for carrying high amperage current between a dedicated kickless welding cable and one of a plurality of special welding heads.

BACKGROUND OF THE INVENTION

Modern day automotive plants for assembling vehicle bodies and the like include a series of robots having welding units thereon that are selectably positioned by the robot to direct high amperage current to the welding head for carrying out various welding operations such as spot welds on the vehicle body or the like. Also, in conjunction with such automated lines, manual and automatic spot welding repair lines can be provided. In such repair lines, each welding gun, heretofore, has been connected to a dedicated power supply including a control panel, a power transformer and a kickless cable having a terminal on the end thereof connected by a nut and bolt to the weld gun. In some cases, such dedicated power supplies have a kickless cable with a terminal thereon configured to be connected to two weld guns. However, such arrangements require a substantial investment in dedicated control and transformer equipment in order to carry out a full range of repair operations by the use of a wide variety of specialized weld guns. The investment in such dedicated controls and power supplies for special weld guns is further accentuated since the investment is only used for a limited amount of time, e.g., in the range of 1% of the full time required to weld vehicle bodies.

Accordingly, such investment in infrequently used dedicated equipment is a cost penalty.

SUMMARY OF THE INVENTION

An object of the present invention is to reduce the cost penalty of standby equipment for manually repairing welds missed by an automated robotic welding line and to do so by the provision of a quick connect/disconnect electrical connector assembly having a first contact continuously connected to a single dedicated power supply and a second contact on each of a plurality of welding guns selectively connected to the contact of the single dedicated power supply for carrying out a plurality of different weld repair operations from the single dedicated power supply.

Another object of the present invention is to eliminate the need for a dedicated power supply for each welding gun of a weld repair system for an automated robotic welding line and to do so by the use of a quick connect/disconnect electrical connector assembly for carrying high amperage current between a single dedicated power supply and a plurality of different weld repair guns through separable contacts having a self-contained lockup mechanism.

Yet another feature of the present invention is to provide for such quick connect/disconnect connector and tool change operation by the provision of first and second contacts with one of the contacts having a frustoconical surface forming a female nest and the other of the contacts having a frustoconical surface forming a male insert; the female nest contact having a pair of dowel pins thereon engageable with bushings on the male contact for guiding the male contact laterally with respect to the female contact during initial mating therebetween and to align a self-contained lockup mechanism in the contacts, e.g., specifically to align a lockup bushing with a spring loaded ball shield which is displaced with respect to a ball cage to allow lock balls to be aligned with a retention flange on the lockup bushing and wherein a hydraulically operated piston directs a piston rod with a ramp surface thereon with respect to the balls to cause them to be wedged in interlocking relationship with the bushing to impose an axial force thereon which is translated through the angle of inclination of the mating frustoconical surfaces to produce a mechanical force coupling at the frustoconical surfaces that will cause contact pressure therebetween of a magnitude to assure welding current flow thereacross with minimal resistance and minimal generation of heat.

A further feature of the present invention is to provide for such a quick connect/disconnect electrical contact assembly having two pairs of contacts, each having a female half and a male half of the type set forth in the preceding object and wherein each of the pairs of contacts are located initially in their connected and disconnected positions by a quick disconnect tool changer for providing a quick disconnect for electrical and fluid connections to a work tool for making welding repairs.

Other objects, desires and advantages of the present invention will become more apparent to those skilled in the art as the nature is better understood from the accompanying drawings and the following detailed description.

DETAILED DESCRIPTION OF A PREFERRED EMBODIMENT

Figure 1:
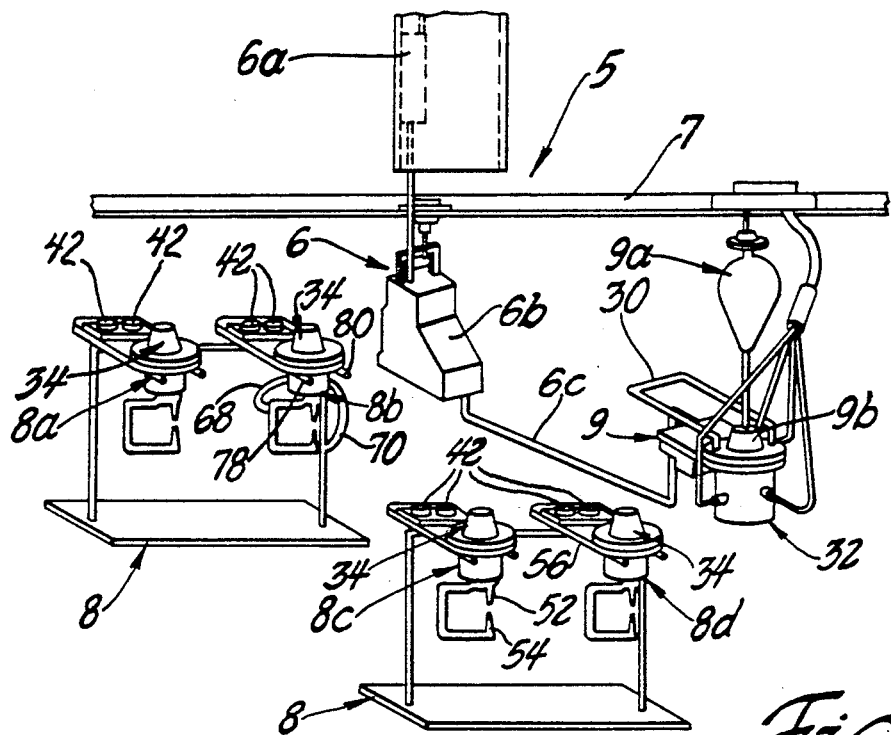
FIG. 1 is a schematic view of a weld repair line including the present invention.

Referring now to FIG. 1, a weld repair line 5 is shown having a single dedicated power supply 6 with a control panel 6a, a transformer 6b, and a kickless cable 6c. The transformer 6b is carried on a conveyor track 7 for positioning with respect to a welding gun rack 8 having a plurality of special weld guns 8a–8d thereon. Each of the weld guns 8a–8d will perform a different weld repair operation which it is connected to the single dedicated power supply 6 by use of the present invention. The present invention includes a single dedicated head portion 9 which is also connected to the conveyor track 7 by a balance hoist 9a.

By virtue of the provision of a number of different weld guns 8a–8d (the number of which will vary depending upon the design of a particular weld repair line) and a single dedicated power supply 6, the total cost of the repair line 5 is considerably less than prior weld repair lines in which each weld gun or pair of weld guns is connected to its own power supply.

In order to accomplish such cost savings, it is necessary to provide separable contacts which will flow high amperage current. In accordance with the present invention, such separability is accomplished by use of contacts on the single dedicated head portion 9 which cooperate with contacts on each of the weld guns 8a–8d during a weld gun selection, to be described, for carrying out a desired weld repair sequence.

Figure 2:
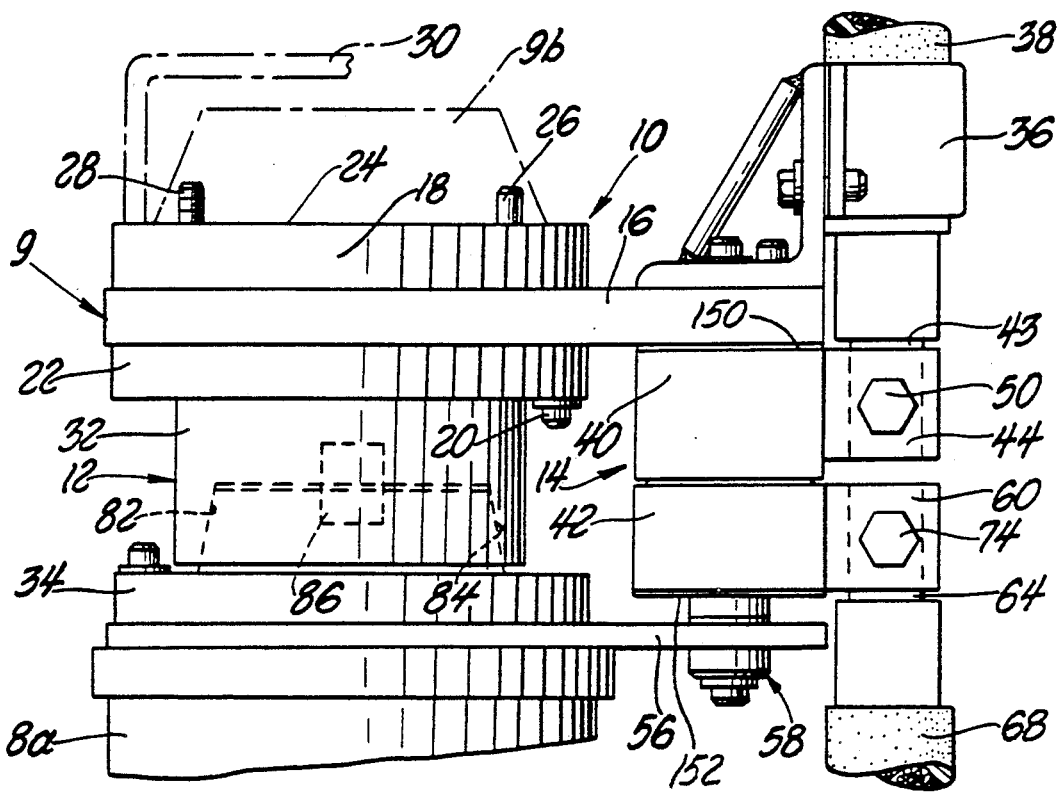
FIG. 2 is a side elevational view of a quick connect/disconnect connector and contact assembly of the present invention.

Referring to FIG. 2, a quick disconnect/connect connector assembly 10 is illustrated having a tool changer 12 and an electrical connector 14 each formed in part by the single dedicated head portion 9.

The tool changer 12 includes an upper plate 16 with a mounting plate 18 on one end thereof which is secured by screws 20 to the upper flange 22 of the tool changer 12. The upper face 24 of the mounting plate 18 has dowel pins 26 and fastening bolts 28 thereon adapted to be connected to the base 9b to a balance hoist 9a on the conveyor track 7. A manipulating arm 30 can be connected to the dedicated head 9 for transferring the head 9 so as to align a female half 32 of the tool changer 12 with respect to a male half 34 thereof on each of the special weld guns 8a–8d.

Figure 3:
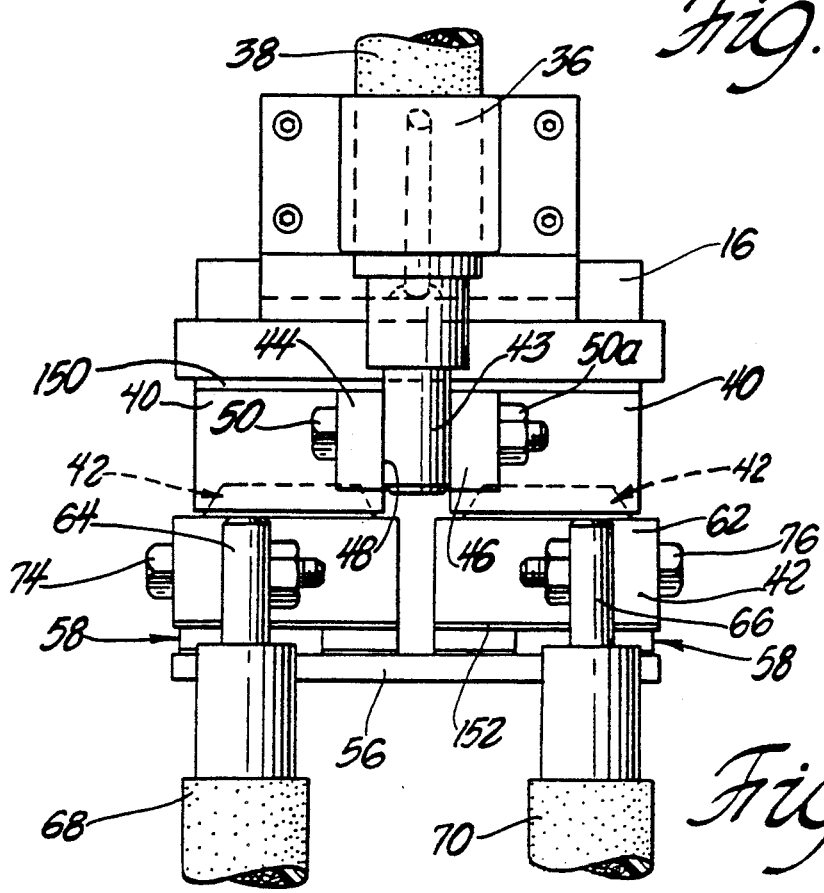
FIG. 3 is an end elevational view of the invention looking in the direction of the arrow 2 is FIG. 1.
Figure 5:
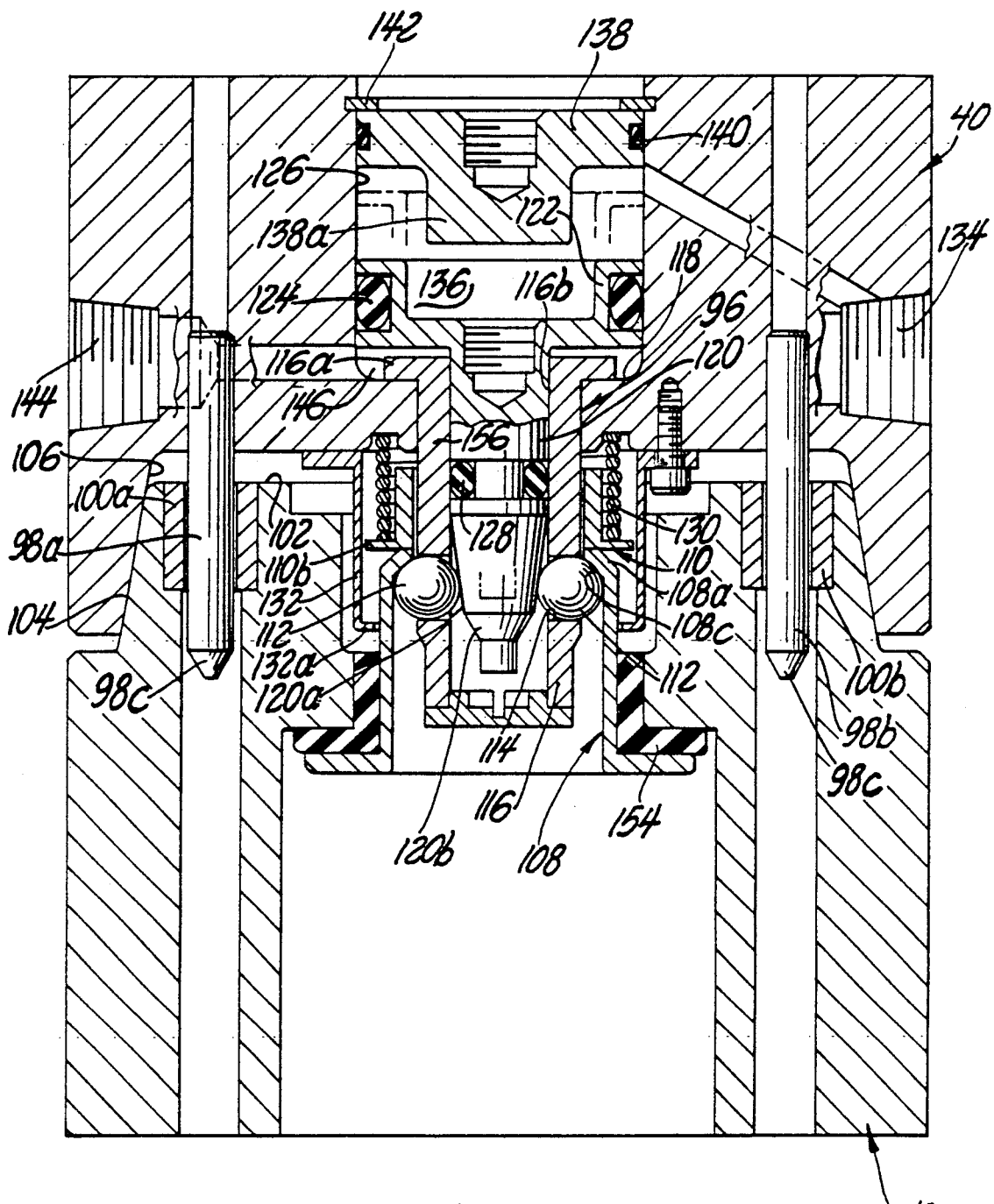
FIG. 5 is a sectional view of electrical contacts of the present invention shown in a locked, current-carrying relationship.

The upper plate 16 also carries a guide sleeve 36 that receives the end 38 of the kickless cable 6c connected to an upper contact block 40 of the electrical connector 14. The upper contact block 40 mates with a selected lower contact block 42 formed on each of the weld guns 8a–8d. The kickless cable 6c has a blade terminal 43 on one end thereof that is inserted between a pair of bifurcated terminals 44, 46 extending from one side of the contact block 40. The bifurcated terminals 44, 46 and the contact block 40 are formed from a suitably electrically conductive brass material. The bifurcated terminals 44, 46 are electrically connected firmly to the terminal 43 at a gap 48 therebetween by a connector bolt 50 and nut 50a which are drawn together to clamp the inside surfaces of the bifurcated terminals 44, 46 into a high pressure electrical contact with the side surfaces of the blade terminal 43, as best seen in FIG. 3.

In accordance with certain principles of the present invention, by virtue of the aforedescribed dedicated head portion and components connected thereto, a permanent connection is made to the power transformer 6b and a control panel 6a for regulating the power supply to the quick disconnect and connect connector assembly 10 of the present invention.

Each of the welding guns 8a–8d have power cables permanently attached thereto as will be described. They also have special tool ends 52, 54 across which high amperage current is applied from the power cables.

The connector assembly 10 further includes a lower plate 56 on each gun 8a–8d that is connected to the male half 34 of the tool changer 12 and the contact block 42. Lower fasteners 58 hold the lower block 42 on the lower plate 56. The lower block 42 has a pair of spaced terminal bars 60, 62 that are adapted to electrically connect to a positive terminal blade 64 and a negative terminal blade 66 on negative and positive cables 68, 70, respectively, of one of the repair weld guns 8a–8d. The spaced terminal bars 60, 62 are connected to the positive and negative terminals 64, 66 respectively by nut and bolt connectors 74, 76, respectively. The result is a direct connection of the lower plate 56 to a selected one of the repair weld guns 8a–8d at a repair station 5 as shown in FIG. 1. The lower plate 56 for each welding gun 8a–8d is supported on arms 78, 80 of welding gun rack 8 as shown in FIG. 1.

In order to couple or decouple a selected one of the repair welding guns 8a–8d to the single transformer 6b, a user manually positions the upper plate 16 with respect to the lower plate 56 to align the female half 32 of the tool changer 12 with the male half 34. The upper plate 16 is moved downwardly with respect to the lower plate 56 so as to cause the separated components of the tool changer 12 to be joined together by operative components into a strong mechanical joint between the upper and lower plates. Various forms of components are suitable for interconnecting the female half 32 and the male half 34 one of which forms is more particularly set forth in U.S. Pat. No. 4,793,053, assigned to an assignee common to the present application. The '053 patent more particularly sets forth the interlocking components, but for purposes of the present invention, it is only necessary to understand that the female half 32 includes a frustoconical surface 82 thereon which is held in interlocked engagement with a frustoconical surface 84 on the male half as shown in broken lines in the elevational view of FIG. 2. A lock mechanism 86 connects the female half 32 to the male half 34 in a relationship to cause the frustoconical surface 82 to be securely held against the frustoconical surface 84 and interlocked thereto by the lock mechanism 86 when the upper plate 16 is moved into an interlocked position with the lower plate 56. The tool changer 12 serves as the main mechanical connection between the balance hoist 30 and one of the supported weld guns 8a–8d during operation of a selected manual repair gun.

In accordance with principles of the present invention, the electrical connector system 14 is operative to direct high amperage current from the transformer 6b to the selected one of the welding guns 8a–8d without excessive resistance or excessive generation of heat across contact surfaces thereof to be described.

As mentioned previously, the electrical connector 14 more particularly includes a first pair of upper contact blocks 40 comprising a female portion that are supported on the upper plate 16. The upper contact blocks 40 remain permanently connected to the transformer 66. The electrical connector system 14 also includes a second pair of male portions-which comprise lower contact blocks 42 that are connected to the lower plate 56 on each one of the repair welding guns 8a–8d.

While a four-gun repair station is illustrated, it should be appreciated that a lesser or a greater number of spot welding guns having desired special welding functions can be carried on the tool rack 8 as required for a particular application.

Also, while a first and a second pair of contacts are illustrated, it should be recognized that a greater or lesser number of contacts can be provided on the upper and lower plates, depending upon a particular application and weld gun design.

Figure 4:
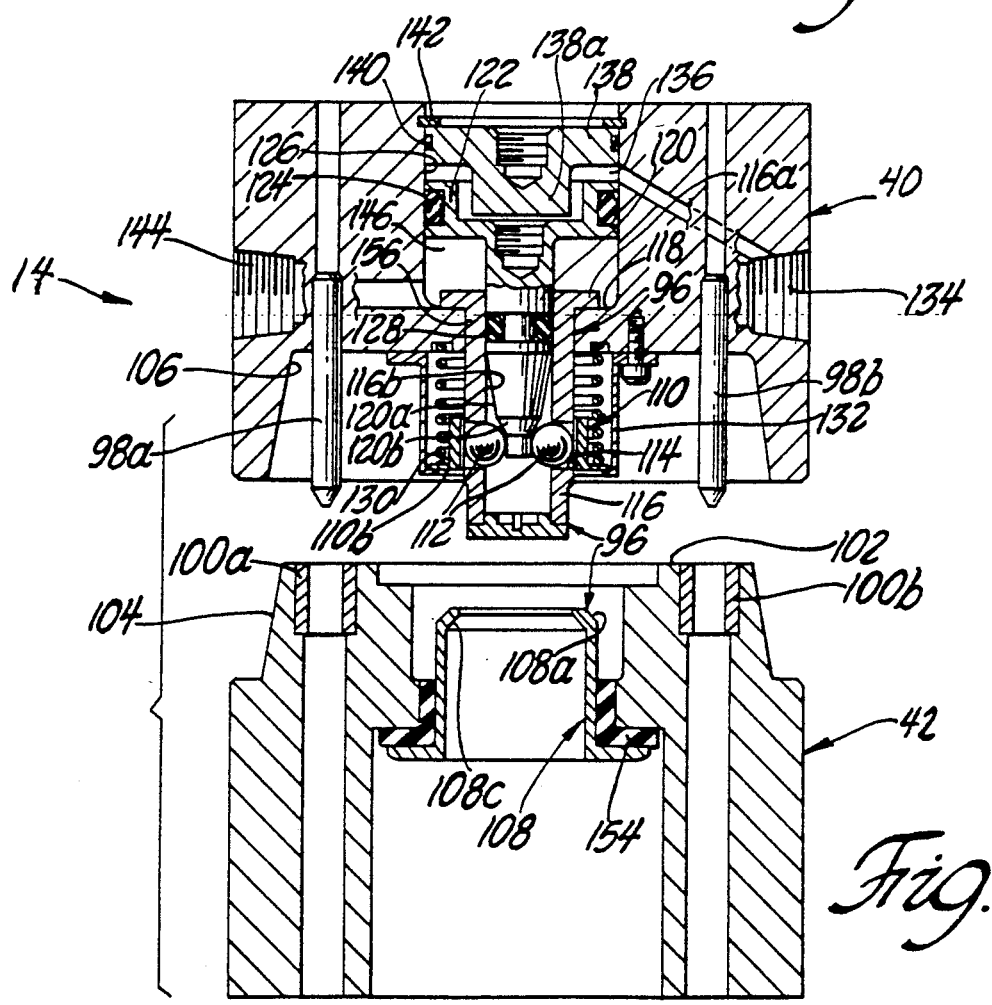
FIG. 4 is a sectional view of electrical contacts of the present invention in a separated position.

Referring now more particularly to FIG. 4, each of the upper contact blocks 40 are connected to each of the mating lower contact blocks 42 by a self-contained lockup mechanism 96 located coaxially of the contact blocks 40, 42.

In accordance with another principle of the present invention, the lockup mechanism 96 is aligned by a pair of dowels or male extensions 98a, 98b supported on each of the upper contact blocks 40 on either side of the lockup mechanism 96. Each of the dowels 98a, 98b are adapted to be received by a pair of guide bearings or receptacles 100a, 100b supported on the upper end surface 102 of each of the lower contact blocks 42. The dowels 98a, 98b each have a tapered end 98c that pilots into the outboard end of each of the guide bearings 100a, 100b so as to laterally position a frustoconical surface 104 on each of the lower contact blocks 42 laterally with respect to a frustoconical surface 106 on each of the upper contact blocks 40 to cause them to move into overlapping engagement. Concurrently, the dowels 98a, 98b align a lockup bushing 108 on each of the lower contact blocks 42 with a ball shield 110 of cylindrical form. The lockup bushing defines a female receptacle for a piston rod male extension on upper contact block 40, as will be described. The ball shield 110 is normally positioned in overlying relationship with a plurality of circumferentially spaced lock balls 112. The lock balls 112 are seated in an opening 114 formed in an inner shell member 116 that extends downward from the inner surface of each of the upper contact blocks 40 where it is supported by a flange portion 116a thereon. The shell member 116 engages a housing shoulder 118 on each of the upper contact blocks 40. The supported shell member 116 has a bore 116b therethrough in which is located a piston rod 120 connected to an actuating piston 122. The actuating piston carries a seal ring 124 that sealingly engages the wall 126 of a cylinder bore formed in each of the upper contact blocks 40. The piston rod 120 also carries an annular seal 128 that sealingly engages the inner surface of the bore 116b to prevent leakage of actuating fluid outwardly of the shell member 116.

As shown in FIG. 4, when the upper contact blocks 40 are separated from the lower contact blocks 42, the ball shield 110 will be held by a spring 130 against a flange 132a of a cage 132 located in concentric surrounding relationship to the inner shell member 116. The ball shield 110 will prevent dirt or moisture from entering the ball shell member 116. When the upper and lower contact blocks 40, 42 are separated, the lockup bushing 108 will have its nose portion 108a located so as to engage the end plate 110b of the ball shield 110 to cause it to shift axially upwardly on the outer surface of the inner shell member 116. The shell member 116 enters the nose segment 108a and will position each of the lock balls 112 at a point to engage an annular inclined surface 108c of the lockup bushing 108 to produce an amplified axially directed lockup force to draw each of the joined contacts in an axial direction.

In order to generate the force, the operating piston 122 has pressurized fluid directed through a port 134 into a chamber 136 that is sealed at its outboard end by a closure member 138 carrying an annular seal 140 and held in place by a snap ring 142. The closure plate 138 has an extension 138a thereon that defines a stop position when the piston rod 120 is located in the release position shown in FIG. 4. When the chamber 136 is so pressurized, the piston and piston rod 120 will be moved to cause an annular inclined cam surface 120a on the end thereof to engage each of the lock balls to force them into lockup engagement with the annular surface 108c so as to apply a significant force multiplied lockup force between the contact blocks 40 and 42 independent of the contour of the frustoconical surfaces 104 and 106. The axial lockup force will draw the frustoconical surfaces 104, 106 together into a non-rotative interface and the inclination of each of the frustoconical surfaces 104, 106 with respect to the Z axis of each of the upper and lower contact blocks 40 and 42 will produce a further force amplification so as to produce a contact force between the male and female contacts of a magnitude that will produce a contact path for high amperage current flow without producing excessive resistance or heat generation.

In the illustrated arrangement, the lockup mechanism 96 has a mechanical advantage in the order of 8:1 and the frustoconical surfaces have a small included angle. Because the lockup mechanism 96 has a great mechanical advantage, e.g., (8:1), and the frustoconical surfaces 104, 106 create a large mechanical advantage of the force normal thereto when seated and engaged, the contact pressure produced at the mated surfaces 104, 106 is of a magnitude to assure passage of high amperage current with minimal resistance and minimal heat generation. Lockup release is provided by directing pressure through port 144 to chamber 146. This causes piston rod 120 to shift up to align end surface 120b with balls 112. The bushing 108 will force the balls into shell member 116.

The ball shield 110 will then be returned by spring 130 to cover the balls 112 and to seat on the flange 132a.

If desired, suitable coolant passages can be provided in the contact blocks 40, 42. Also, it should be noted that suitable electrical insulation is provided between the operative components of the lockup mechanism and the contact blocks 40, 42. The contact blocks 40, 42 are electrically insulated from the plates 16, 56 by insulating boards 150, 152. Insulating bushings 154, 156 on blocks 34, 32 electrically insulate the lock mechanism 96.

While an embodiment of the present invention has been explained, it will be readily apparent to those skilled in the art of the various modifications which can be made to the present invention without departing from the spirit and scope of this invention as it is encompassed by the following claims.

What is claimed is:

1. A quick disconnect/connect electrical connector for an interchangeable robotic welding head having power supplied thereto from a power transformer and a kickless cable characterized by:

first and second contacts each having a frustoconical surface for carrying current therebetween; means for electrically connecting one of said contacts to a power source;

means for electrically connecting another of said first and second contacts to a welding unit; and self-contained lockup means on said first and second contacts for generating a lockup force between said first and second contacts with a significant mechanical advantage independent of the contour of said frustoconical surfaces, said lockup means being operative when said frustoconical surfaces of said first and second contacts are initially mated to cause said frustoconical surfaces to be drawn axially together into a nonrotatable interface and for directing a contact force therebetween to impose a lateral contact pressure therebetween of a magnitude to direct high amperage welding current flow thereacross with minimal resistance and minimal heat generation.

2. The electrical connector of claim 1, characterized by:

means for moving said first and second contacts into initial alignment;

means for laterally aligning said first and second contacts following the initial alignment therebetween; and said lockup means including ball means on one of said contacts and a piston rod means on the other of said contacts engageable only following initial alignment and lateral alignment of said first and second contacts and operative when engaged to impose a mechanical force coupling on said frustoconical surfaces.

3. The electrical connector of claim 1, characterized by:

one of said first and second contacts being a female contact and the other of said first and second contacts being a male contact;

means forming a plurality of female receptacle means on said male contact and means forming a plurality of male extensions on said female contact selectively engageable with said plurality of female receptacle means to first laterally align said first and second contacts as said frustoconical surfaces initially mate and to thereafter impose a mechanical force coupling on said frustoconical surfaces when they are fully mated and seated.

4. The electrical connector of claim 3, characterized by:

said means forming a plurality of male extensions including a shell member having a plurality of lockup balls therein and a shield covering said shell member when said first and second contacts are separated;

said means forming a plurality of female receptacle means including a lockup bushing on said male contact for displacing said shield when said first and second contacts are properly aligned and mated so as to cause said lockup balls to be exposed for engagement with said lockup bushing; and lock means for retaining said lockup balls in a position with respect to said lockup bushing for maintaining a multiplied axial force on said frustoconical surfaces which is further multiplied by the angle of said frustoconical surfaces.

5. The electrical connector of claim 4, characterized by:

said lock means including a piston rod centered within said balls for forcing said balls into and out of said shell member; means including a piston for moving said piston rod into a first position in which the balls are retracted into said shell member and into a second position in which the balls are extended from said shell member.

* * * * *